United States Patent [19]

Hambrecht et al.

[11] Patent Number: 4,482,705

[45] Date of Patent: Nov. 13, 1984

[54] REMOVAL OF THE CATALYST FROM POLYPHENYLENE ETHERS

[75] Inventors: Juergen Hambrecht, Heidelberg; Rudi W. Reffert, Beindersheim; Volker Muench, Ludwigshafen; Adolf Echte, Ludwigshafen; Johann Swoboda, Ludwigshafen, all of Fed. Rep. of Germany

[73] Assignee: BASF Aktiengesellschaft, Fed. Rep. of Germany

[21] Appl. No.: 518,612

[22] Filed: Jul. 29, 1983

[30] Foreign Application Priority Data

Jul. 31, 1982 [DE] Fed. Rep. of Germany ....... 3228662

[51] Int. Cl.$^3$ .............................................. C08G 65/46
[52] U.S. Cl. ..................................... 528/486; 423/24; 528/212; 528/215; 528/216; 528/217
[58] Field of Search ............... 528/212, 486, 215, 216, 528/217; 423/24

[56] References Cited

U.S. PATENT DOCUMENTS

| | | | |
|---|---|---|---|
| 3,755,264 | 8/1973 | Testa | 260/78.5 R |
| 3,837,481 | 9/1974 | Stungis et al. | 209/4 |
| 3,838,102 | 9/1974 | Bennett et al. | 260/47 ET |
| 4,097,458 | 6/1978 | Bennett et al. | 260/47 ET |
| 4,150,218 | 4/1979 | Dabrowski | 528/212 |

*Primary Examiner*—Lester L. Lee
*Attorney, Agent, or Firm*—Keil & Weinkauf

[57] ABSTRACT

High molecular weight polyphenylene ethers are prepared from monohydric phenols by an oxidative coupling reaction with oxygen in the presence of a catalyst complex obtained from a copper salt and an organic amine by a method wherein the metal component of the catalyst is separated off, after the polymerization, by the addition of a polymeric polycarboxylic acid which is essentially composed of unsaturated monofunctional or difunctional carboxylic acids and/or their anhydrides.

Advantageously, the polymeric polycarboxylic acids used are homopolymers or copolymers of (a) from 50 to 100% by weight of one or more unsaturated monofunctional acids of 3 to 10 carbon atoms and/or one or more difunctional acids or their anhydrides of 4 to 6 carbon atoms and from 0 to 50% by weight of one or more monomers which do not possess an acid function and can be copolymerized with (a).

8 Claims, No Drawings

REMOVAL OF THE CATALYST FROM POLYPHENYLENE ETHERS

The present invention relates to a process for the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 10° to 50° C. in the presence of a catalyst complex obtained from a copper salt and an organic amine and in the presence of from 1 to 20 parts by weight of a solvent per part by weight of the monomeric phenol, and in the presence or absence of an activator.

Polyphenylene ethers and processes for their preparation are well known and have been described in many publications, for example U.S. Pat. Nos. 3,306,874, 3,306,875, 3,639,656, 3,642,699 and 3,661,848; the disclosures of these patents have been taken into account in the present application.

The processes most frequently used for the preparation of polyphenylene ethers comprise autocondensation of monohydric phenols in the presence of oxygen and of a catalyst. Preferred catalysts are metal-amine complexes, in particular Cu-amine complexes, and preferred solvents are aromatic hydrocarbons. The reaction is usually terminated by removing the catalyst from the reaction mixture. This is done by using an aqueous solution of an inorganic or organic acid, as carried out, for example, by the countercurrent extraction method in British Pat. No. 1,329,174. Other compounds used are polyaminocarboxylic acids (cf. U.S. Pat. No. 3,838,102) or other chelating agents, eg. nitrilotriacetic acid and its sodium salts or ethylenediaminetetraacetic acid and its sodium salts (cf. U.S. Pat. No. 3,951,917), the latter also in combination with quaternary ammonium salts (cf. U.S. Pat. No. 4,026,870). Isolation of the catalyst with the aid of complex-forming agents from the group comprising the bisguanides has also been described (cf. U.S. Pat. No. 4,097,458). In addition to terminating the oxidative autocondensation, the addition of the complex-forming agent is aimed at achieving very substantially complete removal of the catalyst from the polyphenylene ether, since contamination of the polymer by residual metal has an adverse effect on the entire spectrum of properties of the polymer. The sensitivity to oxidation and the inherent color are particularly affected. All conventional measures for removing the residual catalyst have the disadvantage that repeated extraction steps, entailing complicated separation processes in some cases, have to be used in order to achieve complete removal (residual amounts of metal ions less than 10 ppm). Frequently, these procedures change the character of the polyphenylene ether.

It is an object of the present invention to provide a simple and highly effective method of isolating the residual catalyst in the autocondensation of monohydric phenols in the presence of oxygen.

We have found that this object is achieved, in accordance with the invention, by separating off the metal component of the catalyst, after the polymerization, by the addition of a polymeric polycarboxylic acid which is essentially composed of unsaturated monofunctional or difunctional carboxylic acids and/or their anhydrides.

In a preferred procedure, the polymeric polycarboxylic acid employed is a homopolymer or copolymer comprising (a) from 50 to 100% by weight of one or more unsaturated monofunctional acids of 3 to 10 carbon atoms and/or one or more difunctional acids or their anhydrides of 4 to 6 carbon atoms and (b) from 0 to 50% by weight of one or more monomers which do not possess an acid function and can be copolymerized with (a), and, in particular, the polymeric polycarboxylic acid is used in the form of the free acid or in the form of polysalts with alkali metals and/or alkaline earth metals, and contains, as building blocks, acrylic or methacrylic acid and/or maleic acid or its anhydride, and the polymeric polycarboxylic acid used is a polyacrylic acid, a polymaleic acid or a copolymer comprising from 50 to 95 parts by weight of acrylic acid and from 5 to 50 parts by weight of maleic anhydride.

In another preferred procedure, the polymeric polycarboxylic acid employed is a copolymer comprising from 50 to 95 parts of acrylic acid, from 0 to 48 parts of maleic anhydride and from 2 to 20 parts of a copolymerizable monomer which does not possess an acid function.

It is advantageous for the polymeric polycarboxylic acids employed to have a K value of from 10 to 50, measured on a 1% strength solution in dimethylformamide.

The polymeric polycarboxylic acids and their resins can be used in the form of 1–20% strength aqueous solutions.

Preferably, the polymeric polycarboxylic acids are employed in an amount such that not less than one mole of carboxylic acid groups is present per mole of metal ion.

For the purposes of the present invention, a high molecular weight polyphenylene ether is a chain of alkyl-substituted benzene rings linked in the para-position by oxygen atoms forming ether-like bonds, the chain being formed by oxidative coupling of 2,6-dialkylphenol. The novel polymers have molecular weights of from 10,000 to 90,000, preferably from 20,000 to 30,000, determined by the method described in Macromolecular Synthesis 1 (1978), 83. High molecular weight polyphenylene ethers, also referred to as poly(phenylene oxides), have long been known from the literature (cf. for example U.S. Pat. Nos. 3,661,848, 3,219,625 and 3,378,505) and therefore do not require further description here.

The monohydric phenols which are alkyl-substituted in the two ortho-positions but not in the para-position and may or may not be alkyl-substituted in the meta-position, and which are used for the preparation of high molecular weight polyphenylene ethers are conventional phenols, such as 2,6-dimethylphenol, 2,6-diethylphenol, 2-methyl-6-ethylphenol, 2-methyl-6-propylphenol, 2,6-dibutylphenol and 2,3,6-trimethylphenol, as well as mixtures of these.

To carry out the polycondensation, oxygen is usually passed into the solution of the monomers, at 10°–50° C., in the presence of a catalyst complex. The oxygen throughput is essentially the same as described in U.S. Pat. Nos. 3,306,874 and 3,306,875. In the preferred process according to the invention, the catalyst, comprising a copper salt, preferably copper(I) bromide, an amine and from 0.01 to 5% by weight of 2,6-dimethylphenol, is metered into the initially taken solution of the monomers.

The catalyst complex conventionally used for the polycondensation is usually a combination of an amine, eg. n-dibutylamine, diethylamine, picoline, quinoline, a pyridine base, triisopropylamine, dimethylisopropanolamine, triethanolamine, triisopropanolamine or diisopropanolamine, with a copper salt, eg. copper(I) bromide, copper(I) chloride, copper(I) iodide, copper(II) acetate, copper(II) propionate, copper(II) acetoacetate or copper(II) acetylacetonate. The amine is preferably used in an amount of from 2.0 to 25.0 moles per 100 moles of the monomer, but its concentration in the reaction mixture can vary within wide limits; low concentrations are, however, advantageous. The concentration of the copper salt is kept low, and is preferably from 0.2 to 2.5 moles per 100 moles of the monomer.

The solvent is usually employed in an amount of from 1 to 20 parts by weight per part by weight of the monomer, ie. as high as a 20-fold excess of solvent.

Suitable solvents are benzene, toluene and aliphatic hydrocarbons, preferably $C_6$–$C_{10}$-hydrocarbons.

The reaction mixture may also contain an activator, such as a diarylguanidine or a diarylformamidine (cf. U.S. Pat. No. 3,544,515).

In the process according to the application, the polycondensation reaction is carried out by passing oxygen into a solution of the monomer at from 10° to 50° C., preferably from 18° to 22° C., in the presence of the novel amine complex. The reaction is complete after a short time, ie. the catalyst mixture is metered into the monomer solution in the course of from 0.1 to 1.5 hours, while gassing the solution with oxygen or air.

When the desired yield has been achieved in the polycondensation, and the polymer has attained the desired molecular weight the reaction solution contains from 1 to 30% by weight of polyphenylene ether, from 0.005 to 1.5% by weight of metal ions and about 0.1–6.0% by weight of amine, and may contain small amounts of other materials. In accordance with the invention, this reaction solution is treated with the complex-forming and salt-forming polymeric polycarboxylic acids or their salts in order to isolate the metal catalyst present in the polymer. The manner in which the polymeric polycarboxylic acids are added is not critical. For example, these acids can be added in the absence of a solvent as well as in aqueous solution and in the form of their alkali metal or alkaline earth metal salts. Addition can be effected at once or a little at a time, either continuously or batchwise, with or without additional water. To simplify the embodiment, it is advantageous to employ aqueous solutions of unneutralized or partially neutralized polymeric polycarboxylic acids. The metal compound can be isolated in a suitable apparatus, eg. a filter press, a decantation tank, a knife-discharge centrifuge or the like.

The contact time of the complex-forming and salt-forming agent with the catalyst-containing polyphenylene ether phase can vary within wide limits. It is preferably from 1 minute to 5 hours, and from 5 to 60 minutes are often adequate. The reaction temperature is preferably from 20° to 90° C., but may be below or above this range.

Preferably used polymeric polycarboxylic acids are polymers essentially composed of unsaturated monofunctional and/or difunctional carboxylic acids and/or their anhydrides. Particularly preferred polymeric polycarboxylic acids are homopolymers or copolymers comprising (a) from 50 to 100% by weight of one or more unsaturated monofunctional acids of 3 to 10 carbon atoms and/or one or more difunctional acids or their anhydrides of 4 to 6 carbon atoms and (b) from 0 to 50% by weight of one or more monomers which do not possess an acid function and can be copolymerized with (a). Typical unsaturated monofunctional acids of 3 to 10 carbon atoms are acrylic acid, methacrylic acid, crotonic acid, half-esters of maleic acid with $C_1$–$C_{10}$-alkanols, vinyllactic acid, vinylsulfonic acid and vinylphosphonic acid. Acrylic acid and methacrylic acid are particularly preferred. Typical unsaturated difunctional acids and acid anhydrides of 4 to 6 carbon atoms are maleic acid, maleic anhydride, fumaric acid and itaconic acid. Maleic anhydride is particularly preferred. The monomers of group (a) can be used either alone or as mixtures with one another. Examples of mixtures are acrylic acid and methacrylic acid, acrylic acid and maleic acid, and in particular acrylic acid and maleic anhydride. The polymeric carboxylic acids contain from 50 to 100, preferably from 85 to 98, % by weight of the monomers of group (a).

Suitable monomers of group (b) are all monomers which can be copolymerized with the monomers of group (a). Examples include styrene, α-methylstyrene, esters of acrylic acid or methacrylic acid with monohydric or polyhydric alcohols, preferably with monohydric $C_1$–$C_{10}$-alkanols, diesters of maleic acid with $C_1$–$C_{10}$-alcohols, olefins, eg. diisobutene, dodecene and octadecene, as well as allyl alcohol, vinyl acetate, vinyl alkyl ethers, acrylamide and vinylpyrrolidone. Particularly preferred monomers of group (b) are vinyl acetate, methacrylates, n-butyl acrylate, 2-ethylhexyl acrylate, hydroxypropyl acrylate, styrene, N-vinylpyrrolidone and vinyl isobutyl ether.

Monomers (b) are present in the polymer in amounts of from 0 to 50, preferably from 2 to 15, % by weight.

Examples of particularly suitable polymeric polycarboxylic acids are polyacrylic acid, polymaleic acid, acrylic acid/maleic acid copolymers containing from 5 to 50, preferably from 10 to 30, % by weight of the maleic acid structural elements, and terpolymers comprising from 50 to 95, preferably from 60 to 90, % by weight of maleic anhydride and from 2 to 20, preferably from 2 to 15, % by weight of styrene, a methacrylate or N-vinylpyrrolidone.

The polymeric acids employed according to the invention have K values of from 10 to 50, preferably from 15 to 40, determined according to ISO 174 on a 1% strength solution in dimethylformamide, and can be obtained by a conventional method as described in U.S. Pat. Nos. 3,755,264 or 3,837,481 or German Laid-Open Application DOS No. 3,140,383, so that further description is unnecessary here.

The complex-forming and salt-forming polymeric polycarboxylic acids are employed in amounts such that not less than 1 mole of carboxylic acid groups is present per mole of the metal ion to be removed. In general from 1.2 to 100, particularly preferably from 2 to 50, equivalents of carboxylic acid groups are used per equivalent of heavy metal ion.

Complete removal of the metal catalysts from the polyphenylene ether polymer can be achieved by repeated addition of the novel polymeric polycarboxylic acids followed by isolation of the resulting metal complexes and metal salts by the methods described above. In a preferred embodiment of this invention, however, the entire amount of catalyst is removed from the polymer in one step.

After the metallic component has been removed as a complex and/or a salt, the polyphenylene ether can be isolated from the solution by the methods described in the U.S. patents mentioned at the outset. The isolation of the polyphenylene ether is not critical for the present invention. For example, the polyphenylene ether can be isolated from a reaction solution by precipitation by means of a solution-inhibitor, for example an excess of an alcohol, ie. methanol. The filtered product can be suspended in the alcohol and, if desired, stirred with a decolorizing agent. The polyphenylene ether is then filtered off, and converted to films, fibers, shaped articles, etc. by a conventional process. Other alcohols, eg. isopropanol, propanol or ethanol, are equally suitable.

The amine component of the catalyst can be recovered by distillation or by another conventional method.

As mentioned above, a preferred aspect of the present invention is the preparation of polyphenylene ether solutions which have a low metal content and from which the polymeric substances can be obtained by a total isolation method, eg. spray-drying, steam precipitation or hot-water crumbling. This facilitates the economical use of such processes; in respect of energy required, solvent losses, etc., they are more economical than the conventional precipitation processes.

The particular advantages achieved using the invention are that the polymeric polycarboxylic acid permits virtually complete removal of the residual metal catalyst from the polyphenylene ethers, the resulting polyphenylene ethers, which contain 10 ppm of residual catalyst metal, possess extremely good color stability and stability to oxidation during processing at above 250° C., isolation of the metal catalysts by the novel process is simple and is generally carried out in one step, and polyphenylene oxide reaction solutions having low as well as relatively high concentrations (not more than 25% by weight) can be converted without problems.

The Examples which follow illustrate the invention, although there is no intention to restrict it. Parts are by weight unless stated otherwise.

The intrinsic viscosity is measured on a 0.5% strength solution in chloroform at 30° C.

EXAMPLE 1

Preparation of poly(2,6-dimethyl-1,4-phenylene) ether

In a vessel, 1.3 g of Cu(I) bromide, 20 g of 1,4-dimethylpentylamine and 2 g of 2,6-dimethylphenol (DMP) were stirred for 5 minutes at 20° C. while oxygen was passed in. The mixture was then metered into a solution of 204 g of DMP in 1400 ml of toluene in the course of 30 minutes, after which stirring was continued for a further hour at 20° C. The reaction was carried out in the presence of 30 liters/hour of oxygen.

Purification of the reaction solution

When the reaction was complete, 20 cm$^3$ of a 10% strength aqueous solution of a copolymer comprising 72 parts of acrylic acid and 28 parts of maleic anhydride and having a K value of 30 (measured in a 1% strength solution in dimethylformamide according to ISO 174) were added to the polymer solution, and the mixture was stirred vigorously for 10 minutes at 60° C. When the phases had completely separated out, the organic phase and the aqueous phase were separated, and the polyphenylene oxide was precipitated from the organic phase by adding methanol. After drying, the solid polyphenylene oxide had the properties shown in Table 1.

EXAMPLE 2

Preparation of poly(2,6-dimethyl-1,4-phenylene) ether

A solution of 1.2 g of Cu(I) chloride, 1.9 g of sodium bromide and 0.3 g of methyltrioctylammonium chloride in 15 cm$^3$ of methanol was added to 1100 cm$^3$ of ethylbenzene, and the mixture was stirred at 40° C. Thereafter, 14 g of di-n-butylamine and a solution of 275 g of 2,6-dimethylphenol in 400 cm$^3$ of ethylbenzene were added, and the reaction solution was gassed with 0.1 cm$^3$/hour of oxygen for 90 minutes. The oxygen feed was then discontinued, and the reaction vessel was flushed with nitrogen.

Purification of the reaction solution

When the reaction was complete, the polymer solution was stirred vigorously for 10 minutes at 60° C. with 20 cm$^3$ of a 5% strength aqueous solution of a polyacrylic acid having a K value of 20 (measured on a 1% strength solution in dimethylformamide). After phase separation, the polymer was precipitated from the organic phase by adding methanol, and was washed and dried. The properties of the polyphenylene ether are shown in Table 1.

EXAMPLE 3

The preparation of the poly(2,6-dimethyl-1,4-phenylene) ether was carried out as described in Example 1. The purification of the polymer solution was also carried out as described in Example 1, except that 50 cm$^3$ of a 2% strength aqueous solution of a polymeric acid having a K value of 11 (measured on a 1% strength solution in dimethylformamide) were employed. The properties of the polymer are shown in Table 1.

EXAMPLE 4

The properties of the poly(2,6-dimethyl-1,4-phenylene) ether and the isolation of the catalyst were carried out as described in Example 1, except that the metal component was isolated using 40 cm$^3$ of a 5% strength aqueous solution of the sodium salt of a polyacrylic acid having a K value of 24. The properties of the polymer are shown in Table 1.

EXAMPLE 5

The preparation of the poly(2,6-dimethyl-1,4-phenylene) ether and the isolation of the catalyst were carried out as described in Example 2, except that 100 cm$^3$ of a 2% strength aqueous solution of a copolymer comprising 80 parts of acrylic acid, 15 parts of maleic acid and 5 parts of methyl acrylate and having a K value of 19 (measured on a 1% strength solution in dimethylformamide) were used for isolating the catalyst. The properties of the polymer are shown in Table 1.

COMPARATIVE EXAMPLE A (not according to the invention)

The preparation of the polyphenylene oxide was carried out as described in Example 1. To purify the polymer solution, 4.0 g of ethylenediaminetetraacetic acid (cf. Example 1, U.S. Pat. No. 3,838,102) were added and the polymer solution was stirred for a further hour at 50° C. It was then centrifuged, and the organic phase was separated off. The polymer was precipitated by adding methanol. After drying, the polyphenylene oxide had the properties shown in Table 1.

COMPARATIVE EXAMPLE B (not according to the invention)

The preparation of the poly(2,6-dimethyl-1,4-phenylene) ether was carried out as described in Example 2. Residual metal catalyst was removed from the polymer solution by adding 4.0 g of di-o-tolylbisguanide to the reaction mixture (cf. Example 1, U.S. Pat. No. 4,097,458) and stirring the mixture for 30 minutes at 40° C. Thereafter, the mixture was acidified, the organic phase was decanted and the polymer was precipitated by means of methanol. The resulting polyphenylene oxide had the properties shown in Table 1.

TABLE 1

|  | Intrinsic viscosity dk/g | Copper content ppm |
|---|---|---|
| Example |  |  |
| 1 | 0.8 | 7 |
| 2 | 0.6 | 6 |
| 3 | 0.8 | 9 |
| 4 | 0.8 | 11 |
| 5 | 0.6 | 5 |
| Comparative Example (not according to the invention) |  |  |
| A | 0.7 | 16 |
| B | 0.6 | 21 |

We claim:

1. A process for the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 10° to 50° C. in the presence of a catalyst complex obtained from a copper salt and an organic amine and in the presence of from 1 to 20 parts by weight of a solvent per part by weight of the monomeric phenol, and in the presence or absence of an activator, wherein the metal component of the catalyst is separated off, after the polymerization, by adding a polymeric polycarboxylic acid which is a homopolymer or copolymer comprising
   (a) from 50 to 100% by weight of one or more unsaturated monofunctional acids of 3 to 10 carbon atoms and/or one or more difunctional acids or their anhydrides of 4 to 6 carbon atoms, and
   (b) from 0 to 50% by weight of one or more monomers which do not possess acid function and can be copolymerized with (a), wherein the polymeric polycarboxylic acid or its resin is employed in the form of a 1–20% strength aqueous solution, and wherein the polymeric polycarboxylic acid is employed in an amount such that not less than one mole of carboxylic acid groups is present per mole of metal ions.

2. A process as claimed in claim 1, wherein the polymeric polycarboxylic acid is employed in the form of the free acid or in the form of polysalts with alkali metals and/or alkaline earth metals.

3. A process as claimed in claim 1, wherein the polymeric polycarboxylic acid contains, as building blocks, acrylic acid or methacrylic acid and/or maleic acid or its anhydride.

4. A process as claimed in claim 1, wherein the polymeric polycarboxylic acid used is a polyacrylic acid.

5. A process as claimed in claim 1, wherein the polymeric polycarboxylic acid used is a polymaleic acid.

6. A process as claimed in claim 1, wherein the polymeric polycarboxylic acid used is a copolymer comprising from 50 to 95 parts by weight of acrylic acid and from 5 to 50 parts by weight of maleic anhydride.

7. A process as claimed in claim 1, wherein the polymeric polycarboxylic acid used is a copolymer comprising from 50 to 95 parts by weight of acrylic acid, from 0 to 48 parts by weight of maleic anhydride and from 2 to 20 parts by weight of a copolymerizable monomer which does not possess an acid function.

8. A process as claimed in claim 1, wherein the polymeric polycarboxylic acid used has a K value of from 10 to 50, measured on a 1% strength solution in dimethylformamide.

* * * * *